Nov. 7, 1961            H. MELLE            3,007,381

PHOTOGRAPHIC CAMERA PROVIDED WITH EXPOSURE METER

Filed Oct. 16, 1956

INVENTOR
HEINZ MELLE

BY
ATTORNEYS

United States Patent Office 3,007,381
Patented Nov. 7, 1961

3,007,381
PHOTOGRAPHIC CAMERA PROVIDED WITH
EXPOSURE METER
Heinz Melle, Braunschweig, Germany, assignor to Voigtlander Aktiengesellschaft, Braunschweig, Germany, a corporation of Germany
Filed Oct. 16, 1956, Ser. No. 616,247
Claims priority, application Germany Oct. 19, 1955
1 Claim. (Cl. 95—10)

This invention relates to photographic cameras provided with an exposure meter and it has particular relation to cameras of this type in which certain disadvantages of the systems hitherto used are reduced or eliminated.

The cameras embodying the present invention are preferably provided with a built-in exposure meter. Fundamentally, it is thereby irrelevant on what principle the exposure meter used in the cameras operates and, for example, optical as well as photoelectric exposure meters can be used in carrying out the invention. Due to the objectivity of their light measurements, in practice the photoelectric exposure meters have come more and more into use and they are also particularly preferred in carrying out this invention. For this reason, in the following description of the invention, as examples primarily embodiments are described, in which the measurement of light is effected by means of a photoelectric cell and an electrical measuring instrument connected therewith.

The photographic exposure meters integrate the various luminous flux densities of the field of the object and thereby indicate an average value. However, the knowledge of such an average value is often not sufficient for the success of a photographic picture. Therefore, the manufacturers of exposure meters used to suggest to operators of photographic exposure meters the application of corrective factors based on empirical observations and these factors were suggested to be used in accordance with the conditions prevailing in each case. It will be appreciated that such expediencies do not represent a satisfactory solution of the problem and are not capable of eliminating defective exposures.

In the use of conventional exposure meters, the illumination measured by the exposure meter is not the same as that acting on the photosensitive film upon taking a photographic picture. The several reasons for this will be explained in more detail hereinafter.

The electric currents supplied by a photocell under the effect of light incident in the cell are very small so that, particularly in the case of lower light intensities, the pointer deflections of the measuring instrument are not exactly defined and not clearly readable. The use of photocells having large surfaces in order to avoid this difficulty is possible only to a very limited extent in the case of built-in exposure meters, because, in view of the dimensions of the camera, only little free space is available. Therefore, the expedient was used to cause the measured light to be incident over a large solid angle in the light sensitive cell. Thus, photographic cameras were provided with electric exposure meters in the photocell of which the light was incident in a solid angle which was even larger than the angular field of the picture-taking objective.

It is true that the use of such wide angle exposure meters results in relatively strong pointer deflections. However, it is thereby possible, or even probable, that the indicated light intensity does not correspond to the actual intensity of the light used for picture taking. If, in such cases, the exposure is based on the measured light value, defectively exposed pictures result, frequently even in cases in which the above mentioned empirical corrective factors are taken into consideration. The reason is that such factors are based merely on probability calculations and are only infrequently correctly understood by laymen. Such measurements are basically wrong because the exposure value is determined on the basis of a cone of rays which are different from that by which the photographic picture is brought about.

If the solid angle for the light incident in the photocell and for the light incident through the objective on the light-sensitive negative material are equal, an improved situation results. However, even under such conditions, defective exposure measurements can result, as will be easily understood from general facts of geometric optics.

The appended drawings serve to further explain the present invention and to illustrate, by way of example and without limitation, some embodiments of, and best ways for carrying out, the invention.

Figure 1:
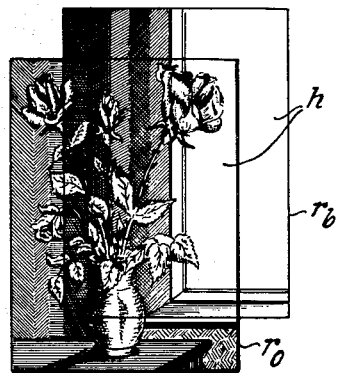
FIGS. 1 and 2 are somewhat diagrammatic illustrations showing the adverse effect which may occur when using an exposure meter in the conventional manner.

Defective measurement of light can actually impair a photographic picture as will be understood from FIG. 1. Within the object field included by the camera objective and limited by frame $r_o$, a bunch of flowers is placed on the top of a table. The illumination on the flowers is at a relatively low level due to the flowers being arranged in front of relatively dark wall paper. This field of the object is assumed to be characterized by a light value 7. If, however, the built-in exposure meter measures the surface defined by the frame $r_b$, the exposure meter will indicate—in view of the presence of the bright surface $h$, for example a window, which represents in the present case of frame $r_b$ about ½ of the measured field—a considerably higher light value, for example, the light value 11. Such differences in the average light density between the object plane included by the picture-taking objective and the object plane included by the exposure meter, which amount up to four light value units, occur in practice not infrequently. Under extreme conditions, the differences can be even higher. By such defective measurements not only color photography, but black and white photography can be essentially affected.

Figure 2:
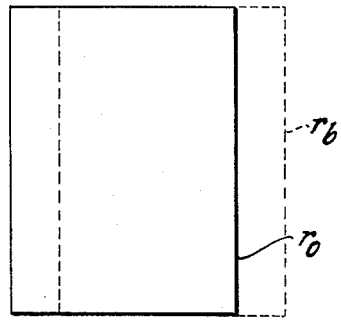

The above described disadvantages are not fundamentally changed even if the plane, perpendicular to the bisector of the solid angle of the light entering the photo cell, and assumed to be the plane in which the light value is measured, coincides with the plane, perpendicular to the axis of the objective, and passing through the objective, such as the group of flowers shown in FIG. 1. In this case, and with reference to FIG. 1, the area measured by the photocell would be off-set from the area of the picture as indicated in FIG. 2.

In order to avoid these disadvantages, which have rather adverse effects in pictures taken at close range, it is contemplated, according to the present invention, to design and arrange the exposure meter in such a manner that its light responsive component is swingable about a fixed point of the camera, in dependence on the sharp focusing of the picture-taking objective. The type of light responsive component used is, in principle, irrelevant, and optical as well as electrical exposure meters can be used. However, as in general measurements characterized by objectivity are superior to measurements affected by subjective influences, in carrying out the present invention, the camera is preferably provided with a photoelectric exposure meter.

In order to render the disclosure of the invention more easily understandable, the electrical measuring mechanism and its connection with the photocell have not been shown in the embodiment illustrated in the drawings. It is to be understood that, in carrying out the present invention, fundamentally any suitable measuring mechanism and indicating method of light measuring can be used. Amplifying devices which may be necessary, and can be used in carrying out the invention and may then be arranged between the photoelectric cell and the measuring device in a manner known by itself, have likewise not been shown in the drawings. Such devices are preferably provided with transistors.

Figure 3:
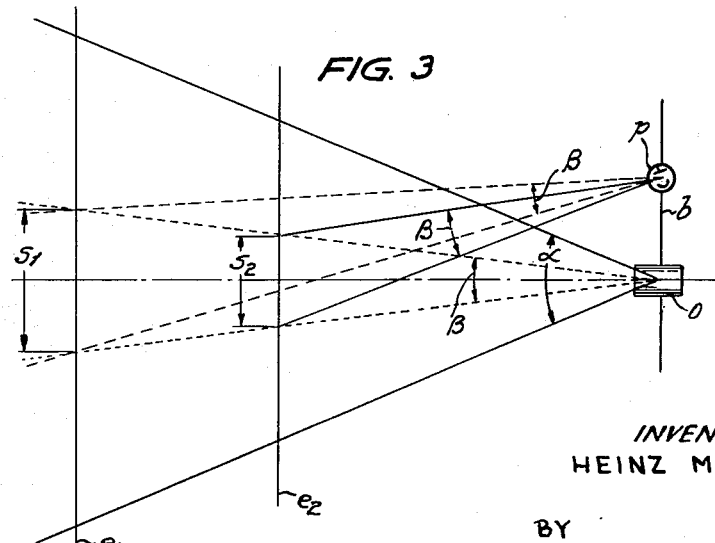
FIG. 3 is a diagrammatic illustration of the light ray cone of the objective and of the photoelectric cell, when the objective and the photoelectric cell are coordinated in accordance with the principles of the invention.

Referring to FIG. 3, the light receiving component of the exposure meter is, in accordance with the present invention, swingably or pivotally mounted in the camera and so associated with the objective that the optical axis of the photocell $p$, for example, will intersect the optical axis of the objective $o$ in the plane $e_1$ of the object to be photographed. Objective $o$ and photocell $p$ have equal solid angles of incident light, the vertices of these angles lying in the same plane which is parallel to the object plane.

The electrical measuring mechanism of the exposure meter can be arranged in any desired manner on, or within, the camera casing and the light sensitive cell can be arranged on, or in, the front wall of the camera. It has been found to be of advantage to arrange the swingable exposure meter element, i.e., for example, the swingable photocell, in the manner illustrated in FIG. 4, i.e., in such a manner that the cell 13 and its point of symmetry, which is decisive for the incidence of light, are located on a straight line which extends parallel to a pair of limiting lines of the image field (which is assumed to be rectangular) and extends at about the level of the diaphragm center of objective 1 through the optical axis of the latter.

In order to completely eliminate the necessity of indicating the position of the light receiving element of the exposure meter in each case, it is contemplated, according to the present invention, to couple the exposure meter with the sharp focusing means of the picture-taking objective. As a result of this, the objective and the exposure meter will be automatically set always to the same picture-taking distance, i.e., to the same object plane.

Figure 4:
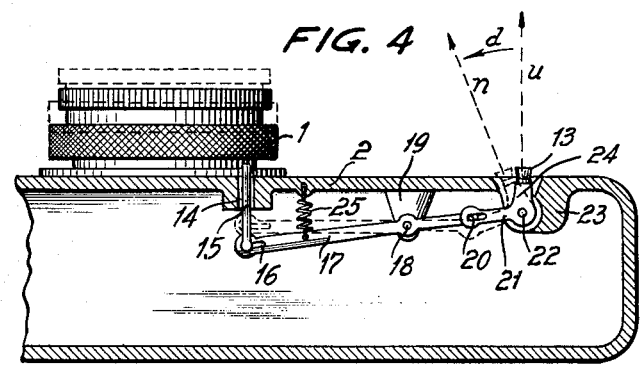
FIG. 4 is a sectional view through a camera illustrating one embodiment of a coupling between the objective and the photoelectric cell in accordance with the invention.

FIG. 4 diagrammatically illustrates an example of coupling the objective and the exposure meter. It is assumed that, in its position shown in full line in FIG. 4, the objective is set to "infinite" and, in its position shown in dotted line in FIG. 4, it is set to "near" distance, for example, to 1 meter. The end of a contact or feeler pin 15 lies against the axially displaceable objective mount 1, said pin being guided in an aperture 14 of camera casing 2. The other end of pin 15 is slidably engaged in a slot 16 in one end of a lever 17 which is swingable about a pivot 18 fixedly arranged in the camera. This end of lever 17 is biased toward camera wall 2 by a spring 25, so that pin 15 will always engage objective mount 1. On its right end in FIG. 6, lever 17 has a pin or peg engaged in a slot 20 of angle lever 21, 24, which is rotatable about shaft 22 fastened to extension 23 of the camera casing, and photocell 13 is fastened to the outer end of arm 24 of lever 21—24. The altitude of the light cone incident in photocell 13 extends, in the position shown in full line, along the dotted rays $u$ toward "infinite." If, in order to adjust it to smaller distances, the objective 1 is moved out of the camera, i.e., away from the front wall, the light cone incident in photocell 13 will move in the direction of arrow $d$, until—in the maximal near position of the objective 1 shown in dotted line—its altitude coincides with the ray $n$ shown in dotted line. This movement is effected through transmission members 15, 17, 21, 24 which are likewise moved to the position shown in dotted line.

The above described novel steps and constructions represent essential improvements. It should be noted that the suggested solid angle provides sufficient light to the photocell for indication without amplification, even if said angle is similar to the angle of normal picture-taking objectives. Therefore, the present invention can be applied without the necessity of additional expenditure to any camera and results in a noticeable improvement of the camera's performance.

By using the above described novel arrangements, defective measurements of the light can be eliminated in many cases. However, in some practically occurring cases, these improvements are still not always entirely satisfactory. The reasons are based on general photographic facts explained in more detail hereinafter.

Normally, a picture is composed of various brightness values which are more or less different from each other. The differences in brightness and contrasts are essential for a successful photographic picture. As already mentioned above, the exposure meter indicates an average value which is averaged from all brightness values of the picture. It will be appreciated that the various brightness values have not always a uniform importance for the picture. For example, the foreground may be of more interest to the photographer than the background, and a near group of trees may be of more interest than a distant forest, or vice-versa. If, for example, the picture of a person is supposed to be taken from a small distance—and perhaps even against the light—against a bright sky in summer as the background, the exposure of the negative material based on the indication of the exposure meter will result in underexposure with regard to the person. The picture will not be satisfactory because its main subject, i.e., the respective person, will be unnaturally dark or will even appear as a silhouette. A defective picture is similarly obtained in the opposite case, i.e., by over-exposure of the most important part of the picture, if the picture of a bright object is taken against an extensive dark background, according to the exposure meter indication.

In view of the experience that, in using the conventional method of measuring the illumination or light with conventional commercial exposure meters, a too large image angle is included, it has already been suggested to impart to the light incidence angle of the photocell used in the exposure meter only about $\frac{1}{10}$ of the value of the solid angle of the picture-taking objective. According to this suggestion, the light incidence angle of the photocell should be smaller than an average photographic object. The loss of photoelectric current caused by the reduction of the light incidence angle can be compensated, for example, by electrical amplification. However, the problem of an always correct measuring of light is by no means satisfactorily solved by this suggestion. It is true that the built-in photocell of the camera, having a small light incidence angle, will measure light which originates from a part of the object to be photographed only. However, there is no guarantee that the incident light to be measured will always originate from the selected main object of the image to be taken.

The difficulty in obtaining correct measurement of the light by means of photocells having small incident light angles is also solved by the present invention, in a simple and reliable manner, utilizing a pivoting or swinging mounting for the photocell.

The swingable or pivotal mountings for photocells having a small angle of incident light are, in principle, the same as in the case of photocells having a large angle of incident light, and particularly photocells having a solid angle of incident light which is equal to that of the picture-taking objective. Therefore, the explanation given above correspondingly applies to FIG. 6.

Conditions which are more favorable than those described will be explained in connection with FIG. 3.

In plane $b$ (see FIG. 3) which represents the front surface of a photographic camera, the picture-taking objective $o$ having an image angle $\alpha$ and the photocell $p$ having a solid angle $\beta$ are arranged. If the objective $o$ is sharply focused to the object plane $e_2$, and if by way of example, the most important portion of the picture is in the center, the photocell $p$ should be adjusted in such a manner that the altitude of its incident light cone or pyramid intersects the optical axis of the objective $o$ in object plane $e_2$. In this manner, the exposure meter will measure merely the light originating from picture portion $s_2$, which is assumed to correspond to a surface amounting to $\frac{1}{10}$ to $\frac{1}{20}$ of the surface included by the objective $o$ in the object plane $e_2$. By adjusting the photocell $p$ to a small important image portion only, in most cases a correct light measurement can naturally be expected, because this important portion of the image will almost always completely cover, in the object plane, the light cone incident in the photocell $p$, so that no side light, which originates from a bright marginal portion or from a luminous sky, is inadvertently measured simultaneously.

If the object plane is displaced from $e_2$ to $e_1$, after adjustment the photocell angle $\beta$ will include the image portion $s_1$, the surface area of which is in the same proportion to the object plane included by the objective $o$ on $e_1$, as the proportion of $s_2$ to the object plane included by objective angle $\alpha$ on $e_2$. Thereby, it is by no means necessary that the most important part of the image be located in the middle of the image as assumed in the illustration in FIG. 3 and such most important image part can be as well located in any other section of the image field. A photographically correct light measurement will always result if only the important portion of the image is measured with the small solid photocell angle $\beta$.

In order to effect swinging of the photocell to the photographically most important portion of the image in all cases, it is contemplated according to the invention to connect the photocell over a ball-and-socket joint, or the like, with the camera. As a device for checking the position of the photocell in each case, for example, a simple arrangement consisting of a sighting device which is swingable together with the photocell can be used. It is practically rather advantageous to reflect the viewing indication into the image field of the finder in a manner known by itself from the art.

It has been found to be of particular advantage to carry out the present invention in combination with a photographic camera which is provided with a measuring finder. In this case a reliable measuring of the light is obtained in a simple manner by coupling the photocell having a small solid light angle with the measuring finder arrangement. Fundamentally, this coupling can be effected in any known manner, for example, by lever or gear mechanisms or by suitably designed cam discs. However, it is preferred to arrange the photocell in such a manner that it is directly connected with a swingable element of the measuring finder and positively follows the movements of the latter. In order to further facilitate the photographer's use of the entire device and to leave no doubt about the portion of the image from which the measured light originates in each case, it is further contemplated to select the solid angle of the photocell in such a manner that it exactly corresponds to the measuring field reflected into the finder and always includes this measuring field only.

The arrangement and devices according to the present invention can be used in all types of cameras and they offer particular advantages when used in cameras provided with a fully automatic device, which is automatically controlled by the exposure meter, for the adjustment of the exposure factors such as diaphragm and shutter time.

It will be understood from the above that this invention is not limited to the elements, devices, arrangements and steps specifically described above and illustrated in the drawings and can be carried out with various modifications without departing from the scope of the invention as defined in the appended claim.

It is possible to use this invention in connection with any kind of known systems of built-in viewfinders. As far as the invention is mentioned in connection with a "measuring finder," this term stands for a known finder system, which simultaneously permits to fix the subject image and to measure the distance of same.

What is claimed is:

In a photographic camera, a casing having a longitudinal axis, an objective mounted upon said casing and longitudinally adjustable, a photocell, a mount for said photocell, means mounting said mount on said casing so that said mount is turnable about a transverse axis and so that said photocell faces generally longitudinally in position to receive light from the same direction as said objective, said objective and said photocell being laterally displaced, the optical axis of the measuring light beam for said photocell being different from the optical axis of said objective, a lever, means mounting said lever on said casing intermediate the ends of said lever so that said lever is pivotable about an axis which is parallel to the pivot axis of said photocell, said mount having a lateral extension extending toward one end of said lever, means pivotally connecting said one end of said lever and said mount extension, a control pin, means mounting said control pin in said casing so that said pin extends longitudinally and is longitudinally movable and has one end adapted to abut an end of said objective, means pivotally connecting the other end of said control pin and the other end of said lever, and spring means coupling said lever and said spring and urging said pin into abutment with said objective, said objective having a limit position in which it is focused on infinity, the axis of said photocell then extending substantially longitudinally, the axis of said photocell being inclined toward the axis of said objective in the direction from which light is received by said objective and said photocell when said objective is moved out of said limit position thereof.

References Cited in the file of this patent

UNITED STATES PATENTS

| | | |
|---|---|---|
| 2,123,494 | Barnack | July 12, 1938 |
| 2,217,861 | Frost et al. | Oct. 15, 1940 |
| 2,528,085 | Sanford | Oct. 31, 1950 |
| 2,796,799 | Strauss | June 25, 1957 |

FOREIGN PATENTS

| | | |
|---|---|---|
| 1,039,830 | France | Oct. 9, 1953 |
| 746,837 | Great Britain | Mar. 21, 1956 |